United States Patent
Kliewer et al.

[11] 3,724,360
[45] Apr. 3, 1973

[54] THERMAL INDICATOR

[75] Inventors: George G. Kliewer; Steven L. Kliewer; Michael G. Kliewer, all of Fresno, Calif.

[73] Assignee: Dun-Rite Manufacturing Corporation, Fresno, Calif.

[22] Filed: Feb. 25, 1971

[21] Appl. No.: 118,910

[52] U.S. Cl. .................99/342, 73/358, 99/99.1, 116/114.5, 116/114 Y
[51] Int. Cl. ..........................A47j 37/00, G01k 13/00
[58] Field of Search.....73/358, 352; 99/421 TP, 342; 116/114.5, 114 Y, 114 Z

[56] References Cited

UNITED STATES PATENTS

| 3,437,070 | 4/1969 | Campbell | 73/358 |
| 3,354,280 | 11/1967 | Slonneger | 73/368 X |
| 1,357,302 | 11/1920 | Schiefer | 116/114.5 |
| 2,924,083 | 2/1960 | Spase | 73/358 X |
| 2,566,494 | 9/1951 | Leese | 116/114.5 X |
| 2,673,466 | 3/1954 | Mumberg | 73/371 |
| 47,228 | 4/1865 | Sharlow | 99/343 |

FOREIGN PATENTS OR APPLICATIONS 203,280  9/1923  Great Britain ...............116/114 Z Primary Examiner—S. Clement Swisher
Assistant Examiner—Daniel M. Yasich
Attorney—Huebner & Worrel

[57] ABSTRACT

A thermal indicator particularly suited for use in indicating temperatures attained by a heated body such as an article of food subjected to cooking temperatures elevated above room temperature. The invention is characterized by a tubular body including a closed end containing a fluid having a predetermined boiling point and an opened end filled with a sealant having a melting point well above room temperature, but substantially below the boiling point of the fluid so that as the boiling point is attained, the fluid is volatilized and the sealant is expelled from the tube and deposited externally of the opened end.

10 Claims, 5 Drawing Figures

PATENTED APR 3 1973 3,724,360
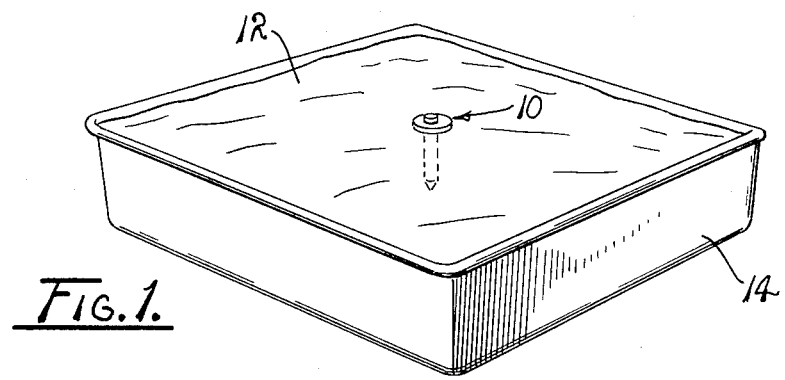
FIG.1.
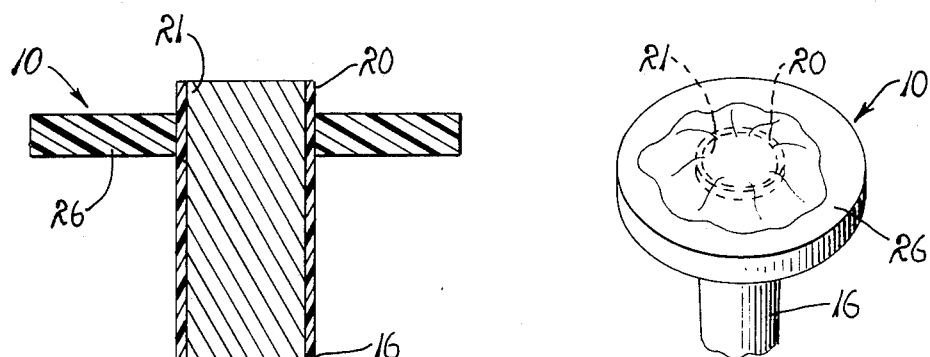
FIG.2. FIG.3.
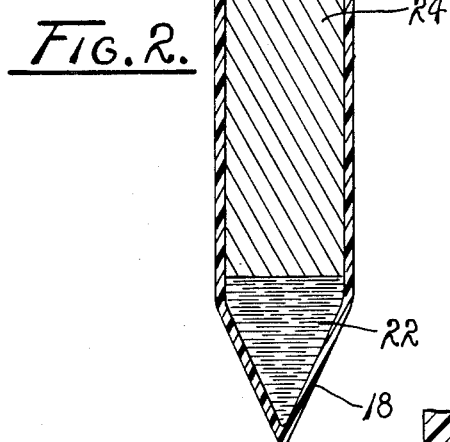 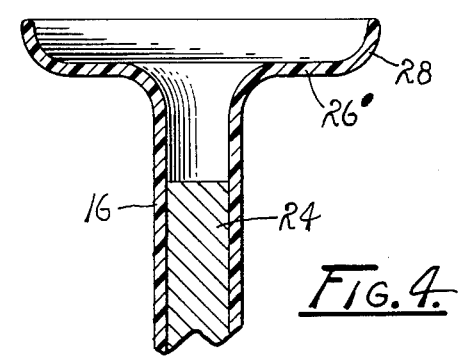
FIG.4.
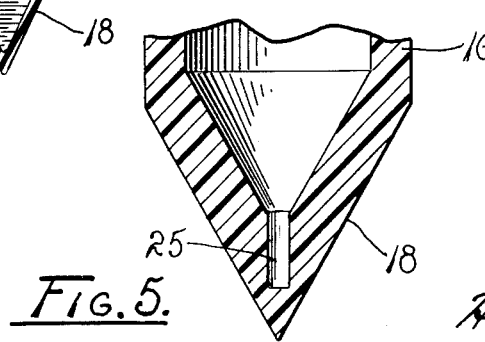
FIG.5.
GEORGE G. KLIEWER
STEVEN L. KLIEWER
MICHAEL G. KLIEWER
INVENTORS
Huebner & Worrel
ATTORNEYS 3,724,360

THERMAL INDICATOR

BACKGROUND OF THE INVENTION

The invention relates to thermal indicators and more particularly to a thermal indicator particularly suited for use in practicing culinary arts.

In practicing culinary arts, particularly in cooking certain articles of food, difficulty often is encountered in monitoring temperatures thereby attained. In the event that the articles of food are insufficiently heated, the quality of the articles often is impaired and, similarly, where the articles are overheated, the impairment of quality is experienced. Consequently, various types of thermal indicators have been provided for use in monitoring temperatures during preparation of various types of food. Among such indicators are those which employ fusible pellets, spring-loaded pins and the like. Representative of devices currently employed are those shown in U.S. Letters Pat. Nos. 3,280,629, 3,140,611 and 3,479,876.

While the patented devices function quite satisfactorily for their intended purposes, a need exists for a practical and even more economical thermal indicator which readily can be employed for monitoring temperatures attained during the preparation of articles of food and the like.

OBJECTS AND SUMMARY OF THE INVENTION

It is therefore an object of the instant invention to provide an improved thermal indicator for monitoring temperatures imparted to a mass being heated.

It is another object to provide an improved thermal indicator for use in practicing culinary arts.

It is another object to provide a practical and economic self-destructing thermal indicator for use in the preparation of food for human consumption.

It is another object to provide an improved, economical and practical thermal indicator which is insertable into an article of food, prior to its being heated, for purposes of providing an indication of a selected temperature change achieved by the article.

These and other objects and advantages are achieved through the use of a tubular body including a closed end containing therein a first substance having a predetermined boiling point, and an opened end sealed by a second substance having a predetermined melting point substantially below the boiling point of the first substance so that as the first substance is boiled-off the sealant is ejected from the tube and deposited about the tube's opened end for thus indicating the presence of a selected temperature.

BRIEF DESCRIPTION OF THE DRAWING

FIG. 1 is a perspective view depicting an article of food having deposited therein a thermal indicator of the type embodying the principles of the instant invention.

FIG. 2 is an enlarged, cross-sectional view of an indicator of the type illustrated in FIG. 1.

FIG. 3 is a fragmented perspective view illustrating the thermal indicator of FIGS. 1 and 2 in an operative mode.

FIG. 4 is a sectioned fragmentary view of a modification of the indicator illustrated in FIG. 1.

FIG. 5 is a sectioned fragmentary view of a modified lower portion of the indicator shown in FIG. 1.

DESCRIPTION OF THE PREFERRED EMBODIMENT

Referring now to the drawings wherein like reference characters designate like or corresponding parts throughout the several views, there is shown in FIG. 1 a thermal indicator, generally designated 10, seated in an article of food 12. As illustrated, the article 12 is an uncooked pastry confined for baking within a baking pan 14. Preferably, in practice, the thermal indicator 10 is inserted into a given article prior to its being heated, however, it is to be understood that, where so desired, the thermal indicator 10 can be inserted into an article 12 subsequent to its being heated.

As shown in FIG. 2, the indicator 10 includes a tubular glass body 16 having a closed, tapered end portion 18 and an open discharge end portion 20 having a discharge opening 21 formed therein. As a practical matter, the body 16 can be fabricated from any suitable material, including various synthetic resins which are both economic to fabricate into appropriate shapes and can readily withstand temperatures encountered in heating the articles to practical temperatures.

Within the closed end portion 18 there is deposited a volatile fluid 22. This fluid has a boiling point approximating the temperature to which a selected article 12 is to be heated. As a practical matter, numerous types of fluids 22 can be employed for providing a large range of operational temperatures for the indicator 10. This range is exemplified by the following chart:

| Fluid | | Boiling Point |
|---|---|---|
| Water | | 100° C. |
| Ethanol and Water | depending on dilutions | 78.5°–100° C. |
| Isovaleraldehyde | | 92°–93° C. |
| Ethyl Acetate | | 77° C. |
| Ethyl Acetate 6.1% Water | Azeotrope | 70° C. |
| Methyl Acetate | | 58° C. |
| Ethyl Formate | | 53° C. |

As illustrated in FIG. 2, the fluid 22 is retained within the closed end portion 18 of the body 16 by means of a sealant 24 which substantially fills the body 16 and closes the opening 21. Preferably, the sealant 24 is in its solid state at room temperatures and has a melting point substantially below the boiling point of the fluid 22 so that it can be melted and subsequently ejected as a boiling of the fluid 22 occurs and a series of bubbles is passed therethrough. In practice, pigmented paraffin, having a melting point of 47° to 65° C., serves quite satisfactorily for this purpose. Pigmentation of the sealant 24 is employed for accommodating a ready recognition thereof.

In order to assure that boiling of the liquid 22 is initiated at its prescribed boiling point, for thus assuring that an orderly, non-violent discharge from the opening 21 of the sealant 24 is, in operation, achieved, the end portion 18 of the body 16 is provided with a nucleation site 25. The nucleation site is, in effect, a concentric bore which, when the fluid 22 is heated to its boiling point, acts to initiate bubbling of the resulting vapor in a manner consistent with the principles of nucleate boiling.

About the open end 20 of the body 16 there is a flotation collar 26. The collar 26 has a diameter sufficient for operatively supporting the body 16 as well as for intercepting and retaining portions of the sealant 24 as it is ejected by bubbles of vapor from the discharge opening 21 of the body 16. The particular material from which the collar 26 is formed is a matter of convenience and can be varied, depending upon the operational temperatures encountered during the heating of the article 12. As presently employed, the collar 26 is fabricated from a foamed synthetic resin and is received about the body 16, as shown in FIGS. 1 through 3. However, it is to be understood that the collar 26 can be provided as a receiver, designated 26' which can be fabricated as a unitary portion of the body 16, FIG. 4, and provided with an annular lip 28 so that the flotation collar 26 also is permitted to serve as a retainer for the sealant 24 as it is ejected from the opening 21.

In order to employ the thermal indicator 10, the body 16 is inserted vertically into the article 12 with the opening 21 being externally oriented and the receiver 26 being seated on the upper surface of the article. The article subsequently is deposited in an associated relationship with an oven, or other heating device, for purposes of transferring heat thereto and thus elevating the temperature of the article. As the article 12 is heated to the boiling point of the liquid 22, heat is transferred to the sealant 24 so that the sealant is changed to its liquid state. Continued heating of the article 12, to the temperature at which nucleate boiling of the fluid occurs, causes the small bubbles to flow from the nucleation site 25 and penetrate the liquid sealant 24 and ultimately pass through the discharge opening 21 of the body 16. As heating of the article 12 continues, the boiling of the fluid 22 becomes more vigorous, whereupon larger bubbles of the resulting vapor penetrate and effect an erupting ejection of the liquid sealant 24 from the body 16. As the sealant is ejected, it is deposited on the surface collar 26. Due to the pigmentation of the sealant 24, its deposit readily is detected. Once a predetermined quantity of the sealant in its fluid state has been ejected from the opening 21 of the body 16, heating of the article 12 can safely be terminated with the knowledge that the article 12 has been properly heated.

In view of the foregoing, it readily should be apparent that the instant invention is embodied in a practical, economic and efficient device which has particular utility, in the preparation of food, as a thermal indicator.

Although the invention has been herein shown and described in what is conceived to be the most practical and preferred embodiment, it is recognized that departures may be made therefrom within the scope of the invention, which is not to be limited to the illustrative details disclosed.

Having described out invention, what we claim as new and desire to secure by Letters Patent is:

1. In a thermal indicator for providing an indication of a heated condition for an article of food when the article is heated to a predetermined temperature, the improvement comprising:
A. a tubular body having an opened end and a closed end, said body being configured for facilitating an insertion of said closed end into an article of food to be heated; and
B. a volatile substance deposited within said body and having a boiling point at substantially the temperature to which the article is to be heated, whereby boiling of the substance within the body is experienced when the article is heated to said predetermined temperature.

2. A thermal indicator for providing an indication of a heated condition for an article of food, when the article is heated to a predetermined temperature comprising:
A. a tubular body having an opened end and a closed end, said body being configured for facilitating an insertion thereof into an article of food to be heated;
B. a volatile substance deposited within said body and having a normal boiling point at substantially the temperature to which said article is to be heated;
C. a pigmented, fusible sealant substantially sealing the opened end of said body, having a melting point above room temperature and below the boiling point of said volatile substance, for confining the substance within said tubular body at room temperatures and to be expelled from said body by said volatile substance in response to a boiling thereof; and
D. a collar circumscribing said body adjacent to the open end thereof for receiving thereon said sealant as it is expelled from said body, for thereby providing an indication of a heated condition for said article.

3. The indicator of claim 2 wherein said volatile substance includes an aqueous solution of ethyl alcohol.

4. The indicator of claim 2 wherein the sealant is a mixture of paraffin and a selected pigment.

5. A temperature responsive indicator adapted to be inserted into a mass to be subjected to temperatures above room temperature comprising:
A. a tubular body having a closed end to be inserted in said mass and an opened end to be disposed externally of the mass;
B. a volatile substance deposited within said tube having a boiling point at a preselected temperature;
C. a sealant closing the opened end of said tube at room temperature, having a melting point above room temperature and below the boiling point of said volatile substance, to be discharged from said body in response to a boiling of said substance when the mass is heated to said preselected temperature; and
D. an external annular collar concentrically supported by said tubular body for receiving said sealant as it is discharged from said body for thereby providing an indication of the temperature of said mass when the mass is heated to said preselected temperature.

6. The indicator of claim 5 wherein the closed end of the tube is provided with means defining a recess forming a nucleation site, for initiating boiling of said substance when the mass is heated to the boiling point of the substance.

7. The indicator of claim 6 wherein said volatile substance is selected from a class of substances having a boiling point within a range extending between 53° and 100°C. the sealant has a melting point between 47° and 65°C.

8. The indicator of claim 7 wherein the class of substances includes water, ethanol, aqueous solution of ethanol, ethyl acetate, aqueous solution of ethyl acetate, methyl acetate and ethyl formate.

9. The indicator according to claim 8 wherein said sealant is pigmented paraffin.

10. The indicator according to claim 9 wherein said collar includes an integrally related, concentric lip.

* * * * *